(12) United States Patent
Athad

(10) Patent No.: US 10,710,174 B2
(45) Date of Patent: Jul. 14, 2020

(54) SLITTING CUTTER AND TOOL KEY IN COMBINATION THEREWITH

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 120 days.

(21) Appl. No.: 16/177,686

(22) Filed: Nov. 1, 2018

(65) Prior Publication Data

US 2019/0160559 A1 May 30, 2019

Related U.S. Application Data

(60) Provisional application No. 62/592,875, filed on Nov. 30, 2017.

(51) Int. Cl.
*B23C 5/08* (2006.01)
*B23D 61/06* (2006.01)
*B23C 5/22* (2006.01)

(52) U.S. Cl.
CPC .............. *B23C 5/08* (2013.01); *B23C 5/2239* (2013.01); *B23D 61/06* (2013.01); *B23C 2210/161* (2013.01); *B23C 2220/36* (2013.01); *B23C 2260/52* (2013.01)

(58) Field of Classification Search
CPC . B23C 5/08; B23C 2210/161; B23C 2260/52; B23D 61/06
See application file for complete search history.

(56) References Cited

U.S. PATENT DOCUMENTS

| 402,400 | A | * | 4/1889 | Cook | ..................... | B23D 61/06 |
| | | | | | | 76/80 |
| 1,672,458 | A | * | 6/1928 | Horner | .................. | B23D 61/06 |
| | | | | | | 76/80 |
| 6,116,823 | A | | 9/2000 | Mihic | | |

(Continued)

FOREIGN PATENT DOCUMENTS

DE    20 2017 101032    3/2017

OTHER PUBLICATIONS

International Search Report dated Apr. 24, 2019, issued in PCT counterpart application (No. PCT/IL2018/051173).

(Continued)

*Primary Examiner* — Alan Snyder
(74) *Attorney, Agent, or Firm* — Womble Bond Dickinson (US) LLP

(57) ABSTRACT

A slitting cutter having a disk-shaped cutter body with a plurality of circumferentially spaced insert receiving portions and a plurality of cutting inserts retained therein. Each insert receiving portion has first and second clamping jaws spaced apart by an insert receiving slot, the first clamping jaw resiliently displaceable and having a resilient axis of rotation. The number of cutting inserts resiliently clamped in the slitting cutter is an inner cutting diameter defined by the plurality of resilient axes of rotation multiplied by a spacing factor of between 0.15 and 0.30. A tool key having first and second key prongs is used in combination with the slitting cutter. The second key prong has a thrust surface with a concave profile. In a partially assembled position of the slitting cutter the thrust surface contacts at least one of two spaced apart first and second corner surfaces of the respective cutting insert.

24 Claims, 7 Drawing Sheets

(56) References Cited

U.S. PATENT DOCUMENTS

| | | |
|---|---|---|
| 8,905,684 B2 | 12/2014 | Waggle et al. |
| 2008/0298922 A1* | 12/2008 | Oettle .................. B23C 5/22 |
| | | 409/137 |
| 2015/0056026 A1 | 2/2015 | Hecht |
| 2016/0311038 A1 | 10/2016 | Gamble et al. |

OTHER PUBLICATIONS

Written Opinion dated Apr. 24, 2019, issued in PCT counterpart application (No. PCT/IL2018/051173).

* cited by examiner

SLITTING CUTTER AND TOOL KEY IN COMBINATION THEREWITH

RELATED APPLICATIONS

The present application claims priority to U.S. Provisional Patent Application No. 62/592,875, filed Nov. 30, 2017, the contents of which are incorporated by reference in their entirety.

FIELD OF THE INVENTION

The present invention relates to a slitting cutter and a tool key in combination therewith, for use in metal cutting processes in general, and for slitting operations in particular.

BACKGROUND OF THE INVENTION

For the purpose of the specification and claims, the term "slitting cutter" is intended to be inclusive of tools configured for slitting or slotting applications.

Within the field of slitting cutters, there are many examples of integral one-piece slitting cutters having a plurality of cutting teeth. FIGS. 1 and 2 show an integral one-piece slitting cutter 120 according to the prior art having an outer cutting diameter DO of 63 mm, a cutting width WC of 1 mm, and a plurality of 48 cutting teeth 142. Such a slitting cutter, may be limited to a maximum rotational speed of approximately 1260 rpm for slitting operations in a workpiece material such as spring steel, and has a simple tooth design devoid of chip forming capabilities, which may limit the feed rate per tooth to approximately 0.4 μm due to the associated high cutting forces. Such limitations may result in a feed rate per revolution of approximately 0.02 mm, and a feed rate per minute of 25-30 mm. Further disadvantages of integral one-piece slitting cutters are the short life-cycle and the reduced repeatability after regrinding.

Within the field of slotting cutters, typically having wider cutting widths than slitting cutters, there are many examples of disk-shaped cutting bodies having a plurality of insert receiving portions circumferentially spaced about the cutter body and a plurality of cutting inserts removably retained therein, which use a tool key to aid insertion and extraction of the cutting inserts.

U.S. Pat. No. 6,116,823 discloses a slot milling tool comprising a disc having a thickness in the range of 2-6 mm and a plurality of insert receiving seats circumferentially arranged around the periphery thereof, each insert receiving seat having a cutting insert retained therein by means of an elastically resilient projection defined by two cutting slots, the inner ends of the two slots being located significantly radially inward of the insert receiving seat.

U.S. Pat. No. 6,116,823 also discloses a tool used in combination with the slot milling tool, for insertion and extraction of the cutting inserts. The tool used for insertion and extraction of the cutting inserts has two cylindrical shaped pins, one of which is inserted into a hole adjacent the insert receiving seat and the other which is inserted into an opening formed at the outer end of one of the slots. Rotation of the tool around a fulcrum formed by the pin in the hole causes the other pin to lift the elastically resilient projection, thus providing sufficient space for insertion or extraction of the respective cutting insert.

SUMMARY OF THE INVENTION

In accordance with the present invention, there is provided a slitting cutter, under one aspect of the invention, comprising:

a disk-shaped cutter body having a cutter axis of rotation defining a direction of rotation about the cutter axis of rotation, opposing first and second body side surfaces, and a body peripheral surface extending therebetween, a plurality of insert receiving portions circumferentially spaced about the body peripheral surface and a plurality of cutting inserts removably retained therein,
  at least radially outer portions of the first and second body side surfaces contained in first and second reference planes, respectively, the first and second reference planes offset by a body width,
  each insert receiving portion having first and second clamping jaws spaced apart by an insert receiving slot, the first clamping jaw resiliently displaceable relative to the second clamping jaw and having a resilient axis of rotation,
  each cutting insert resiliently clamped in its respective insert receiving slot, and having a cutting edge intersecting the first and second reference planes,
  wherein:
  the plurality of cutting edges define an outer imaginary circle having an outer cutting diameter, and the plurality of resilient axes of rotation define an inner imaginary circle having an inner cutting diameter,
  and wherein:
  the number N of cutting inserts resiliently clamped in the slitting cutter, is the inner cutting diameter, in millimeters, multiplied by a spacing factor, and
  the spacing factor is between 0.15 and 0.30.

Also in accordance with the present invention, there is provided a slitting cutter in combination with a tool key:

the slitting cutter comprising a disk-shaped cutter body having a cutter axis of rotation defining a direction of rotation about the cutter axis of rotation, opposing first and second body side surfaces, and a body peripheral surface extending therebetween, a plurality of insert receiving portions circumferentially spaced about the body peripheral surface and a plurality of cutting inserts removably retained therein,
  at least radially outer portions of the first and second body side surfaces contained in first and second reference planes, respectively, the first and second reference planes spaced apart from one another by a body width,
  each insert receiving portion having first and second clamping jaws spaced apart by an insert receiving slot, the first clamping jaw resiliently displaceable relative to the second clamping jaw,
  each cutting insert resiliently clamped in its respective insert receiving slot, and having a cutting edge intersecting the first and second reference planes,
  the tool key comprising a first end portion with opposing first and second engagement side surfaces, and first and second key prongs protruding from the first engagement side surface along first and second key axes, respectively,
  the second key prong having a thrust surface, the thrust surface having a concave profile in a cross-section taken in a fourth reference plane containing the second key axis,
  wherein in a partially assembled position of the slitting cutter with the tool key engaged thereto:
  the first key prong engages a key recess adjacent one of the insert receiving slots, and
  the thrust surface contacts at least one of two spaced apart first and second corner surfaces of the respective cutting insert.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
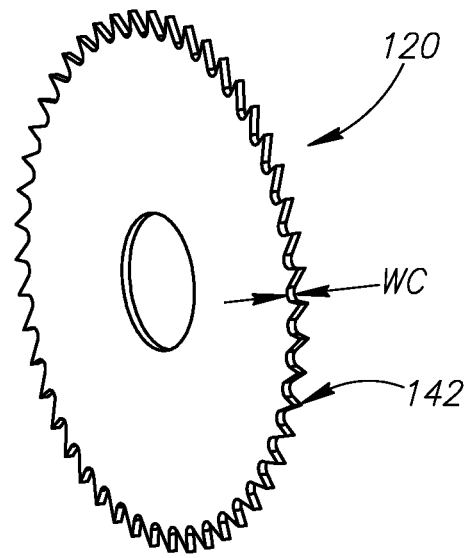
FIG. 1 is a perspective view of a slitting cutter according to the prior art.
Figure 2:
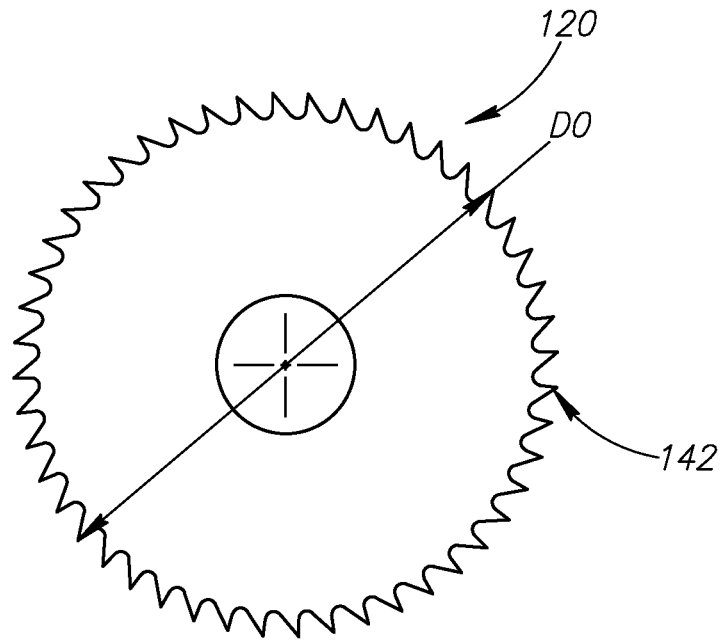
FIG. 2 is a side view of the slitting cutter shown in FIG. 1.
Figure 3:
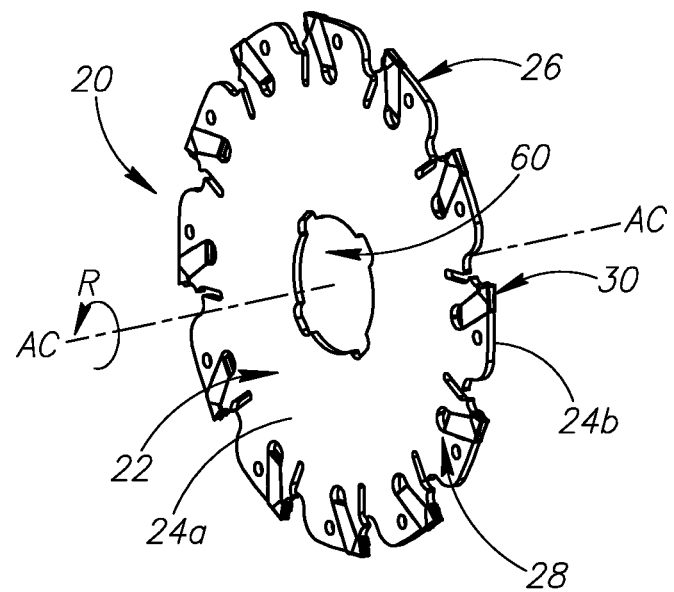
FIG. 3 is a perspective view of a slitting cutter in accordance with some embodiments of the present invention.

As shown in FIGS. 3 to 6, the present invention relates to a slitting cutter 20 comprising a disk-shaped cutter body 22 having a cutter axis of rotation AC defining a direction of rotation R about the cutter axis of rotation AC, two opposing first and second body side surfaces 24a, 24b, and a body peripheral surface 26 extending therebetween.

A plurality of insert receiving portions 28 are circumferentially spaced about the body peripheral surface 26 and a plurality of cutting inserts 30 are removably retained therein.

In some embodiments of the present invention, the plurality of cutting inserts 30 may be equal in number to the plurality of insert receiving portions 28.

In some embodiments of the present invention, the cutting inserts 30 may be manufactured by a suitably hard material, preferably by form pressing and sintering a cemented carbide, such as tungsten carbide, and the cutter body 22 may also be manufactured from a cemented carbide or a less hard material, such as steel.

Figure 6:
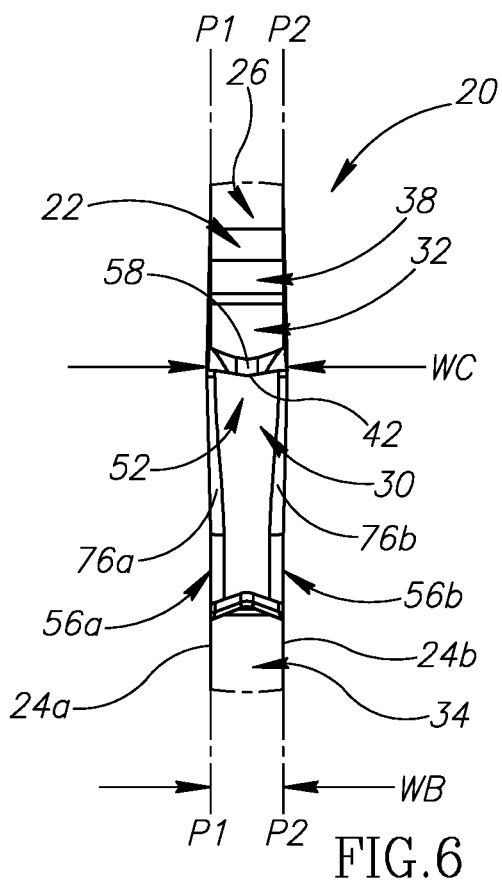
FIG. 6 is a detailed peripheral view of the slitting cutter shown in FIG. 3.

As shown in FIG. 6, at least radially outer portions of the first and second body side surfaces 24a, 24b are contained in first and second reference planes P1, P2, respectively, and the first and second reference planes P1, P2 are offset by a body width WB.

In some embodiments of the present invention, the body width WB may be at least 0.40 mm and at most 1.20 mm, i.e. 0.40 mm≤WB≤1.20 mm.

Figure 4:
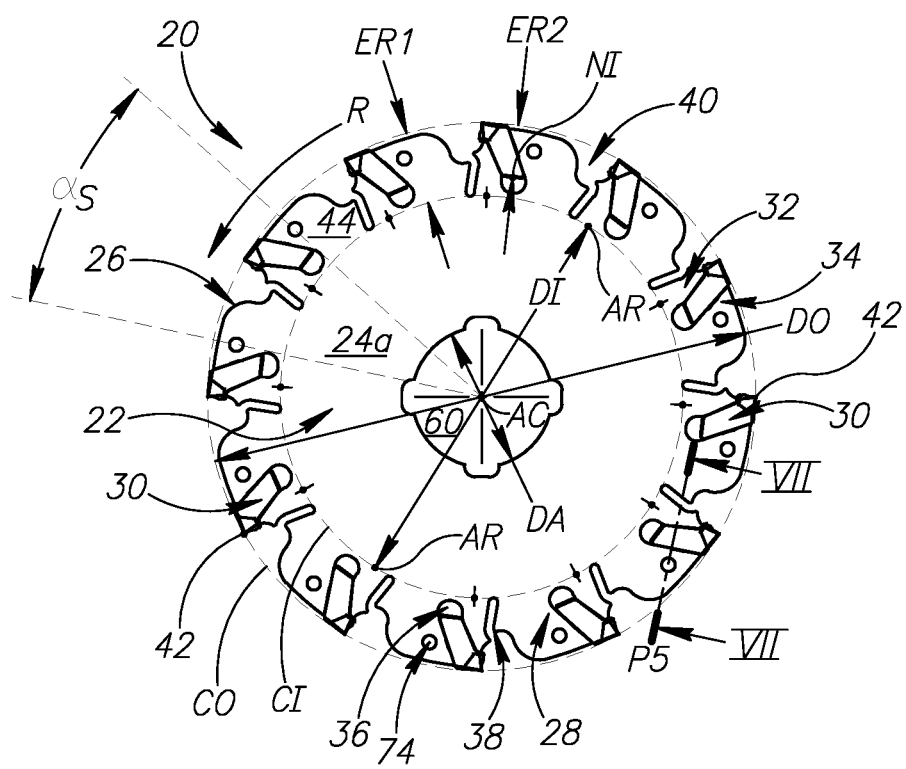
FIG. 4 is a side view of the slitting cutter shown in FIG. 3.
Figure 5:
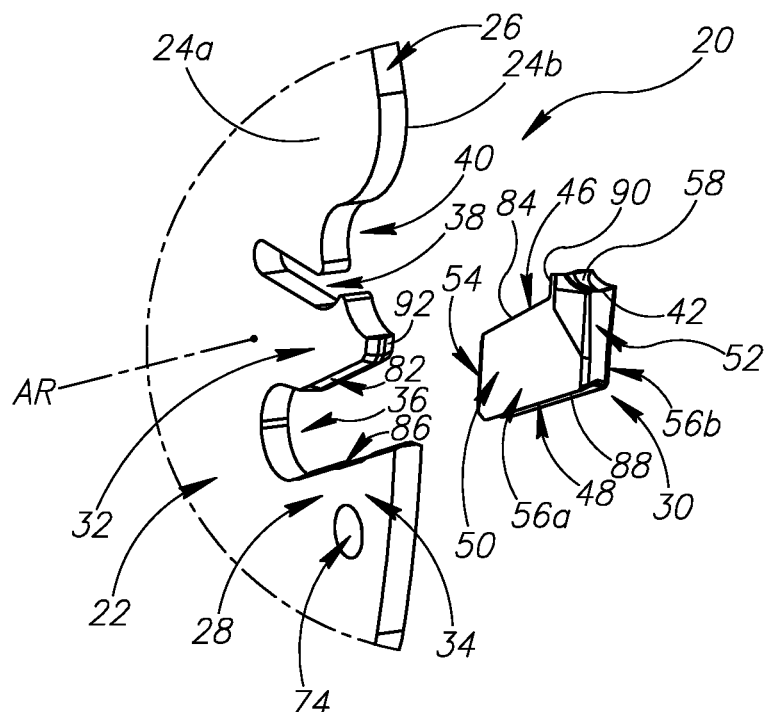
FIG. 5 is a detailed exploded perspective view of the slitting cutter shown in FIG. 3.

As shown in FIGS. 4 and 5, each insert receiving portion 28 has first and second clamping jaws 32, 34 spaced apart by an insert receiving slot 36, the first clamping jaw 32 being resiliently displaceable relative to the second clamping jaw 34 and having a resilient axis of rotation AR.

In some embodiments of the present invention, the second clamping jaw 34 may have greater rigidity than the first clamping jaw 32.

Also in some embodiments of the present invention, each resilient axis of rotation AR may be parallel to the cutter axis of rotation AC.

Further in some embodiments of the present invention, each first clamping jaw 32 may be elongated, and extend radially outwardly from its resilient axis of rotation AR.

Figure 10:
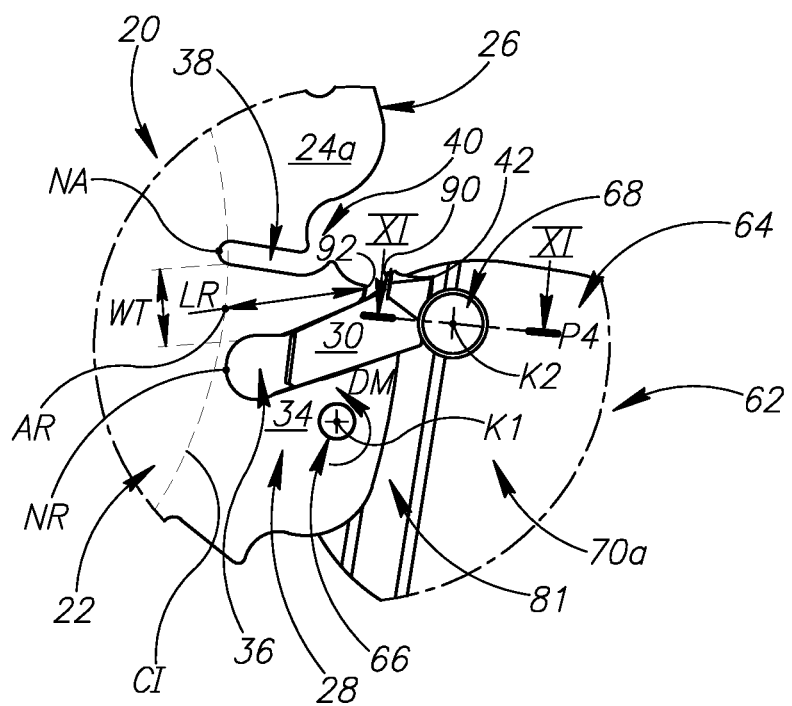
FIG. 10 is a detailed side view of the slitting cutter and the tool key shown in FIG. 8.

It should be appreciated that for such embodiments, each first clamping jaw 32 is elongated by virtue of the having a radial length LR greater than a terminal width WT, the terminal width WT being measured in a side view of the slitting cutter 20, as shown in FIG. 10, in the vicinity of the resilient axis of rotation AR.

As shown in FIGS. 3 to 6, each first clamping jaw 32 may be spaced apart from the second clamping jaw 34 of the circumferentially adjacent insert receiving portion 28 by an auxiliary slot 38.

In some embodiments of the present invention, each auxiliary slot 38 may be located rotationally forward of the insert receiving slot 36 associated with the same insert receiving portion 28.

Also in some embodiments of the present invention, each auxiliary slot 38 may be unoccupied.

As shown in FIGS. 3 to 6, each insert receiving slot 36 and each auxiliary slot 38 may communicate with a chip evacuation recess 40 in the body peripheral surface 26.

In some embodiments of the present invention, each chip evacuation recess 40 may be entirely located radially outward of the respective resilient axis of rotation AR.

For such embodiments of the present invention, each chip evacuation recess 40 may have a volume sufficient to efficiently evacuate chips during slitting operations at the optimum feed rate per insert, without limiting the number of insert receiving portions 28 that can be circumferentially spaced about the body peripheral surface 26.

As shown in FIGS. 4 and 10, in side views of the slitting cutter 20, each insert receiving slot 36 has a radially innermost receiving slot point NR, the auxiliary slot 38 has a radially innermost auxiliary slot point NA, and the resilient axis of rotation AR may be located between the radially innermost receiving slot point NR and the radially innermost auxiliary slot point NA.

In some embodiments of the present invention, the resilient axis of rotation AR may be located midway between the radially innermost receiving slot point NR and the radially innermost auxiliary slot point NA.

Also in some embodiments of the present invention, the radially innermost auxiliary slot point NA may be located radially inward of the radially innermost receiving slot point NR.

As shown in FIG. 6, each cutting insert 30 is resiliently clamped in its respective insert receiving slot 36, and has a cutting edge 42 intersecting the first and second reference planes P1, P2.

It should be appreciated that each cutting edge 42 may span a cutting width WC greater than the body width WB, and each cutting edge 42 may be described as 'fully effective'.

It should also be appreciated that each cutting insert 30 is clamped in its respective insert receiving slot 36 in a self-retaining manner, relying on resilience of the first clamping jaw 32 and the rigidity of second clamping jaw 34, and devoid of any additional non-integral insert retaining members, such as screws, cams or wedges.

It should be further appreciated that the maximum rotational speed of the slitting cutter 20 may be limited by the capacity of each insert receiving slot 36 to resiliently retain its respective cutting insert 30 against the centrifugal forces acting thereon, plus an acceptable factor of safety.

For such embodiments of the present invention, having an outer cutting diameter DO of 63 mm, the maximum rotational speed may be approximately 1440 rpm for slitting operations in a workpiece material such as spring steel.

As shown in FIG. 4, the plurality of cutting edges 42 define an outer imaginary circle CO having the outer cutting diameter DO and an outer cutting circumference of $\pi*DO$.

Also, as shown in FIG. 4, the plurality of resilient axes of rotation AR define an inner imaginary circle CI having an inner cutting diameter DI, and thus an inner circumference of $\pi*DI$. An annular cutting portion 44 is formed between the inner imaginary circle CI and the outer imaginary circle CO.

In some embodiments of the present invention, the annular cutting portion 44 may exhibit rotational symmetry about the cutter axis of rotation AC.

As shown in FIG. 5, each cutting insert 30 may have opposing upper and lower surfaces 46, 48 and an insert peripheral surface 50 extending therebetween, and the insert peripheral surface 50 may have opposing front and rear surfaces 52, 54 spaced apart by opposing first and second insert side surfaces 56a, 56b.

In some embodiments of the present invention, the cutting edge 42 may be formed at the intersection of the upper surface 46 and the front surface 52.

Also in some embodiments of the present invention, each cutting insert 30 may be non-indexable and have only one cutting edge 42.

As shown in FIG. 5, each insert's upper surface 46 may include a chip forming surface 58 adjacent the cutting edge 42.

It should be appreciated that the chip forming surface 58 is configured to control the flow of chips and reduce cutting forces acting on the cutting insert 30, thus enabling slitting operations with a high feed rate per insert, for example 4.0 µm in a workpiece material such as spring steel, which is 10 times greater than the feed rate per tooth of the integral one-piece slitting cutter 120 according to the prior art, discussed above.

As shown in FIG. 4, the annular cutting portion 44 has a first radial extent ER1 equal to half of the difference between the outer cutting diameter DO and the inner cutting diameter DI, i.e. $ER1=(DO-DI)/2$, and the magnitude of the first radial extent ER1 may vary according to the configuration of the insert receiving portions 28, and not the outer cutting diameter DO.

Also, as shown in FIG. 4, each cutting insert 30 has a radially innermost insert point NI located a second radial extent ER2 radially inward of the outer imaginary circle CO, and the second radial extent ER2 may be greater than half of the first radial extent ER1, i.e. $ER2>ER1/2$.

In some embodiments of the present invention, the second radial extent ER2 may be greater than two-thirds of the first radial extent ER1, i.e. $ER2>ER1*2/3$.

Also in some embodiments of the present invention, the radially innermost insert point NI may be located on the insert's rear surface 54.

According to a first aspect of the present invention, the number N of cutting inserts 30 resiliently clamped in the slitting cutter 20 is roughly proportional to the inner cutting diameter DI. More particularly, the number N is determined by the inner cutting diameter DI (in mm) multiplied by a spacing factor FS between 0.15 and 0.30, i.e. $DI*0.15<N<DI*0.30$. Thus, the angular spacing $\alpha_S$ (in degrees) between adjacent insert receiving slots 36 is roughly inversely proportional to the inner cutting diameter DI and falls within the range $360°/(DI*0.30)<\alpha_S<360°/(DI*0.15)$.

It should be appreciated throughout the specification and claims, that the spacing factor FS has units of 1/mm, and the ratio of the number N of cutting inserts 30 to the inner cutting diameter DI applies when the inner cutting diameter DI is measured in millimeters.

It should also be appreciated that for embodiments of the present invention in which FS is between 0.15 and 0.30, and $DI*0.15<N<DI*0.30$, each first clamping jaw 32 maintains an adequate level of resilience and each second clamping jaw 34 maintains an adequate level of rigidity throughout slitting operations performed at the maximum rotational speed and high values of feed rate per insert.

It should be further appreciated that for embodiments of the present invention in which FS is between 0.15 and 0.30, and $DI*0.15<N<DI*0.30$, and the annular cutting portion 44 has a relatively small first radial extent ER1, for example, ER1<10 mm, the number N of cutting inserts 30 relative to the outer cutting diameter DO, and thus the feed rate per revolution, may be advantageously high.

For embodiments of the present invention having, for example, an outer cutting diameter DO equal to 63 mm and an inner cutting diameter DI equal to 47 mm, there may be a plurality of 12 cutting inserts 30 resiliently clamped in the slitting cutter 20, advantageously resulting in a feed rate per revolution of approximately 0.048 mm and a feed rate per minute of approximately 70 mm for slitting operations in a workpiece material such as spring steel.

In some embodiments of the present invention, the spacing factor FS may be between 0.20 and 0.30, i.e. $DI*0.20<N<DI*0.30$.

Also in some embodiments of the present invention, the annular cutting portion 44 may exhibit N-fold rotational symmetry about the cutter axis of rotation AC.

As shown in FIG. 4, the cutter body 22 may include a central aperture 60 coaxial with the cutter axis of rotation AC, having an aperture diameter DA.

For embodiments of the present invention in which the body width WB is at least 0.40 mm and at most 1.20 mm, the outer cutting diameter DO may be no more than 120 mm greater than the aperture diameter DA, i.e. $DO \leq DA+120$ mm.

In various embodiments, the outer cutting diameter DO may range from 30 mm to 200 mm while the inner cutting diameter DI may range from 12 mm to 185 mm. A diameter-width ratio $R_{DW}$ of the inner cutting diameter DI to the body width WB is typically in the range of $10<R_{DW}<240$.

According to an additional aspect of the present invention, as shown in FIGS. 8 to 12, a tool key 62 is used in combination with the slitting cutter 20.

Figure 8:
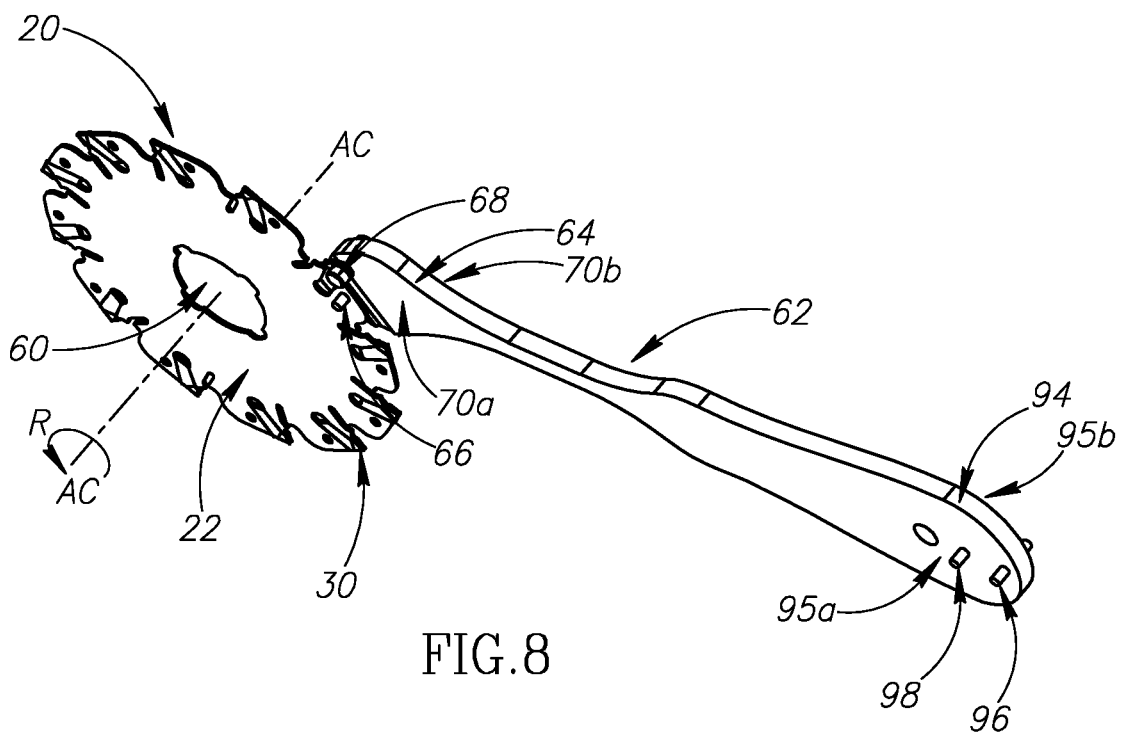
FIG. 8 is a perspective view of the slitting cutter in a partially assembled position and a tool key engaged thereto.
Figure 9:
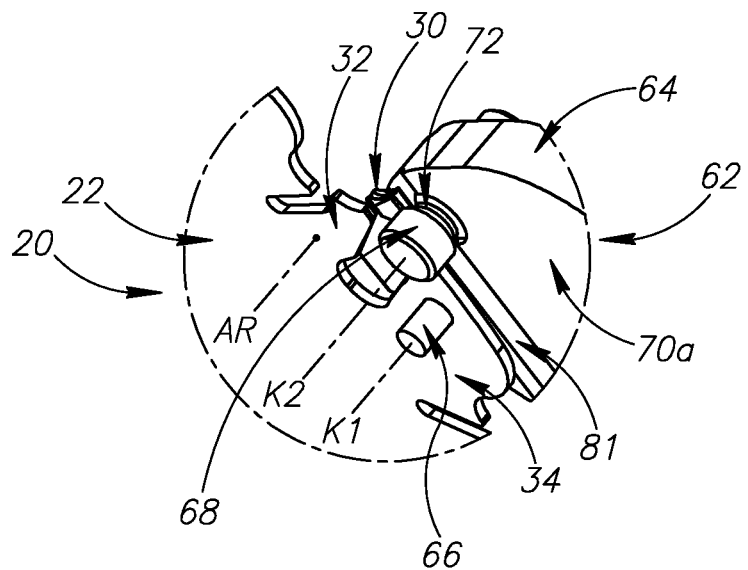
FIG. 9 is a detailed perspective view of the slitting cutter and the tool key shown in FIG. 8.

As shown in FIGS. 8 to 10, the tool key 62 has a first end portion 64 with opposing first and second engagement side surfaces 70a, 70b, and spaced apart first and second key prongs 66, 68 protruding from the first engagement side surface 70a along first and second key axes K1, K2, respectively.

In some embodiments of the present invention, the first and second key axes K1, K2 may be perpendicular to the first engagement side surface 70a.

Also in some embodiments of the present invention, the first key prong 66 may be cylindrical-shaped, and have a diameter of 1-2 mm.

Figure 11:
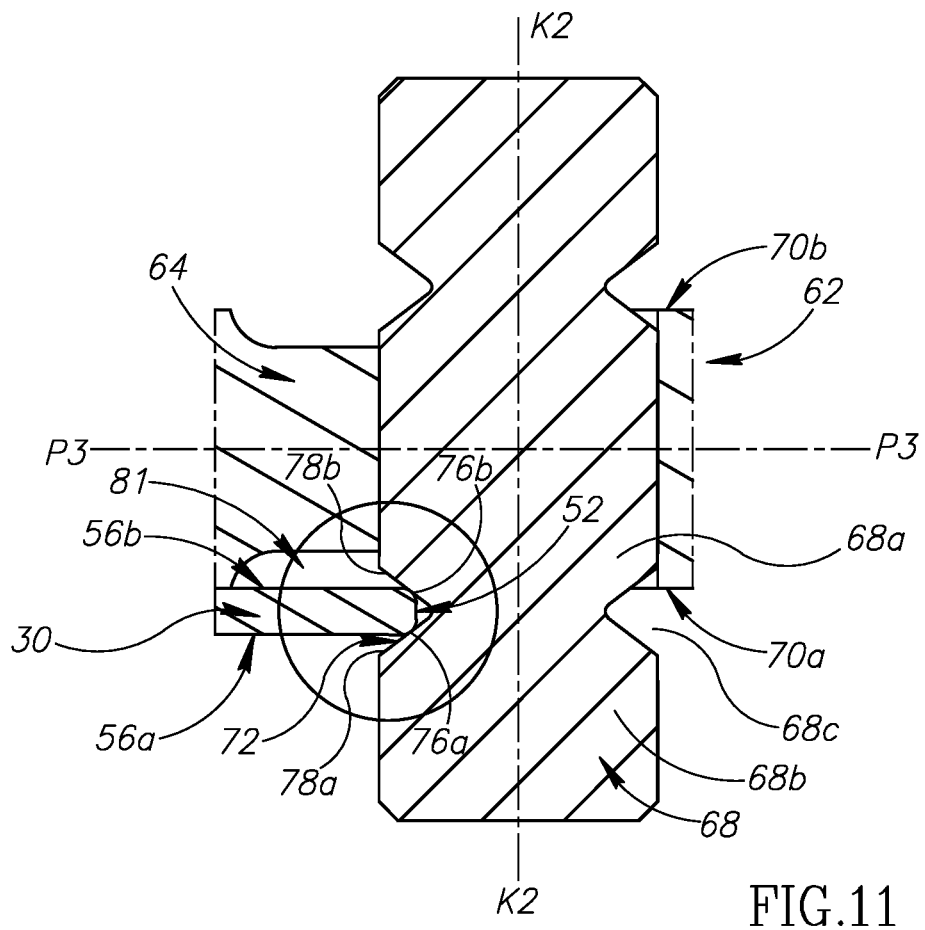
FIG. 11 is a partial cross-sectional view of the slitting cutter and the tool key shown in FIG. 10, taken along the line XI-XI.

Further in some embodiments of the present invention, as shown in FIG. 11, the first end portion 64 may exhibit mirror symmetry about a third reference plane P3 perpendicular to the first and second key axes K1, K2.

For such embodiments, the first end portion 64 may be described as both left-handed and right-handed.

Figure 12:
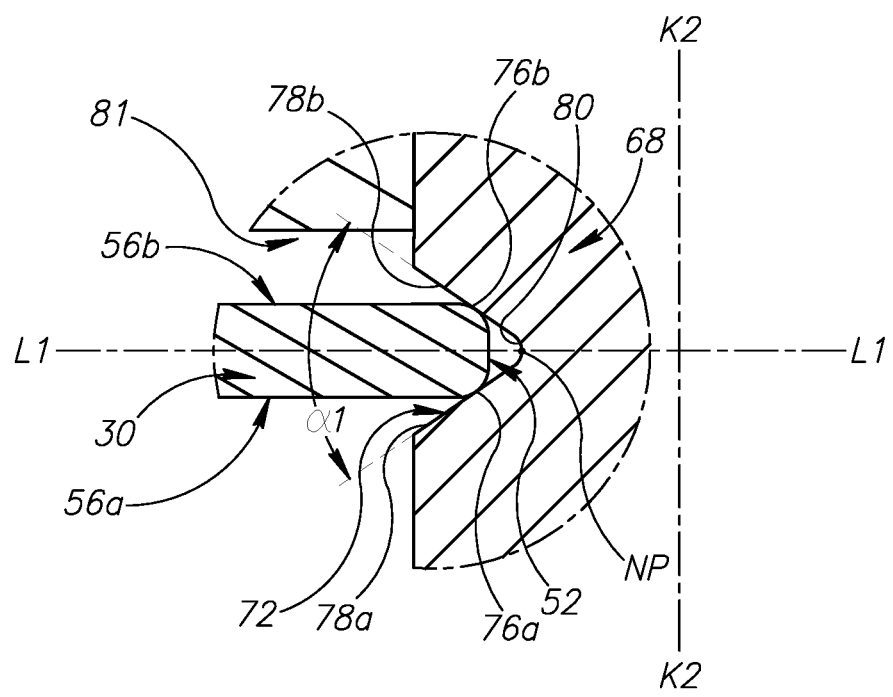
FIG. 12 is a detailed view of the partial cross-sectional view shown in FIG. 11.

The second key prong 68 comprises a base portion 68a connected to a head portion 68b via a narrowed neck portion 68c. The narrowed neck portion 68c has a thrust surface 72. As shown in FIGS. 11 and 12, in a cross-section taken in a fourth reference plane P4 containing the second key axis K2, the thrust surface 72 has a concave profile.

In a partially assembled position of the slitting cutter 20 with the tool key 62 engaged thereto, as shown in FIGS. 8 to 12, the first key prong 66 engages a key recess 74 adjacent one of the insert receiving slots 36. Additionally, the front surface 52 of the cutting insert 30 is received into the narrowed neck portion 68c and the thrust surface 72 contacts at least one of two spaced apart first and second corner surfaces 76a, 76b of the respective cutting insert 30.

In such an arrangement, the first engagement side surface 70a may be in contact with one of the first and second body side surfaces 24a, 24b.

In some embodiments of the present invention, as shown in FIGS. 11 and 12, in the cross-section taken in the fourth reference plane P4, the first and second corner surfaces 76a, 76b may be curved.

As shown in FIG. 6, the first and second corner surfaces 76a, 76b may be formed at intersection of the front surface 52 and the first and second insert side surfaces 56a, 56b, respectively.

In some embodiments of the present invention, the key recess 74 may intersect the first and second body side surfaces 24a, 24b.

Also in some embodiments of the present invention, the key recess 74 may be located rotationally rearward of the associated insert receiving slot 36.

The thrust surface 72 may have two axially adjacent first and second flank surfaces 78a, 78b, and as shown in FIGS. 11 and 12, in the cross-section taken in the fourth reference plane P4, the first and second flank surfaces 78a, 78b may diverge away from the second key axis K2.

In some embodiments of the present invention, at least one of the two first and second flank surfaces 78a, 78b may contact at least one of the two first and second corner surfaces 76a, 76b.

Also in some embodiments of the present invention, the first flank surface 78a may be located axially further from the first engagement side surface 70a than the second flank surface 78b, and the first flank surface 78a may contact one of the two first and second corner surfaces 76a, 76b.

For embodiments in which only the first flank surface 78b is in contact with only one of the two first and second corner surfaces 76a, 76b (not shown), the first engagement side surface 70a may provide lateral support for the cutting insert 30, and thus a stable and repeatable means for urging each cutting insert 30 into its respective insert receiving slot 36.

Further in some embodiments of the present invention, the first and second flank surfaces 78a, 78b both may contact the first and second corner surfaces 76a, 76b, respectively.

It should be appreciated that for embodiments of the present invention in which each insert's cutting edge 42 spans a relatively thin cutting width WC, for example 1 mm, the abovementioned two-point contact between the second key prong's concave thrust surface 72 and the respective insert's first and second corner surfaces 76a, 76b advantageously provides a stable and repeatable means for urging each cutting insert 30 into its respective insert receiving slot 36.

It should also be appreciated that in some embodiments of the present invention, the same tool key 62 may be suitable for providing one-point or two-point contact between the second key prong's concave thrust surface 72 and the respective insert's first and/or second corner surfaces 76a, 76b for slitting cutters 20 in which the body width WB is at least 0.40 mm and at most 1.20 mm.

As shown in FIGS. 11 and 12, in the cross-section taken in the fourth reference plane P4, the first and second flank surfaces 78a, 78b may form an external wedge angle α1, and the wedge angle α1 may be at least 70 degrees and at most 130 degrees, i.e. 70°≤α1≤130°.

It should be appreciated that use of the term "external angle" throughout the description and claims refers to an angle between two surface components as measured external to the member on which these surface components are formed.

It should also be appreciated that for embodiments of the present invention in which the wedge angle α1 is at least 70 degrees and at most 130 degrees, the first and second flank surfaces 78a, 78b may advantageously provide a stable and repeatable means for engaging each insert's first and second corner surfaces 76a, 76b.

In some embodiments of the present invention, each of the first and second flank surfaces 78a, 78b may have a frusto-conical shape.

Also in some embodiments of the present invention, the first and second flank surfaces 78a, 78b may be spaced apart by a transition groove 80.

Further in some embodiments of the present invention, the second flank surface 78b may be partially located in a clearance channel 81 in the first engagement side surface 70a.

For such embodiments, the clearance channel 81 may have a depth sufficient to accommodate a laterally extending portion of the insert's cutting edge 42 without contact.

As shown in FIGS. 11 and 12, in the cross-section taken in the fourth reference plane P4, an imaginary first straight line L1 perpendicular to the second key axis K2 and containing a radially innermost peripheral point NP of the thrust surface 72 may be located midway between the first and second corner surfaces 76a, 76b.

In the partially assembled position of the slitting cutter 20, as shown in FIGS. 8 to 12, a first clamping surface 82 of the first clamping jaw 32 may be in partial contact with an upper fastening portion 84 of the respective insert's upper surface 46, and a second clamping surface 86 of the second clamping jaw 34 may be in partial contact with a lower fastening portion 88 of the respective insert's lower surface 48.

In some embodiments of the present invention, as shown in FIGS. 4 and 5, the first and second clamping surfaces 82, 86 may extend radially along the insert receiving slot 36.

Also in some embodiments of the present invention, rotation of the tool key 62 in a mounting direction DM about the first key axis K1 may urge the associated cutting insert 30 into the insert receiving slot 36 until a finally assembled position of that cutting insert in the slitting cutter 20 is achieved. It is understood that this process may be repeated for each cutting insert 30 into a corresponding insert receiving slot 36, until a finally assembled position of the slitting cutter 20 is achieved.

In the finally assembled position of the slitting cutter 20, as shown in FIGS. 3 to 7 and 13, the first clamping surface 82 may be in full contact with the upper fastening portion 84 of the respective insert's upper surface 46, and the second clamping surface 86 may be in full contact with the lower fastening portion 88 of the respective insert's lower surface 48.

Figure 7:
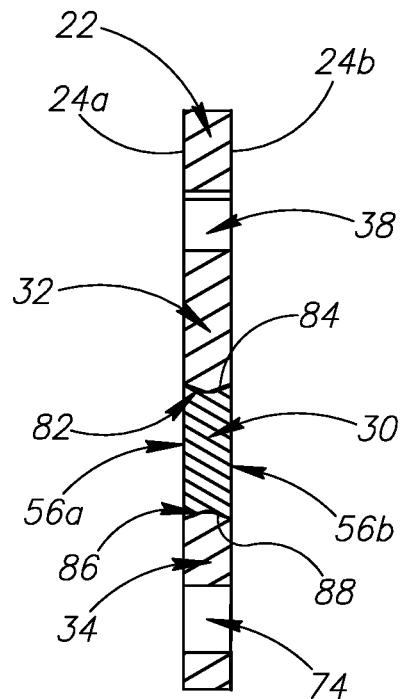
FIG. 7 is a partial cross-sectional view of the slitting cutter shown in FIG. 4, taken along the line VII-VII.

As shown in FIG. 7, in a cross-section taken in a fifth reference plane P5 transverse to one of the insert receiving slots 36, the first and second clamping surfaces 82, 86 may be V-shaped and the respective upper and lower fastening portions 84, 88 may be correspondingly V-shaped.

In the finally assembled position of the slitting cutter 20, as shown in FIGS. 3 to 5 and 13, a shoulder surface 90 of each insert's upper surface 46 may be in contact with a radially outward facing stopper surface 92 of the respective first clamping jaw 32.

In some embodiments of the present invention, as shown in FIG. 5, the shoulder surface 90 may be located between the chip forming surface 58 and the upper fastening portion 84 of the insert's upper surface 46.

Also in some embodiments of the present invention, each insert's rear surface 54 may face radially inwardly and not be in contact with the cutter body 22.

Figure 13:
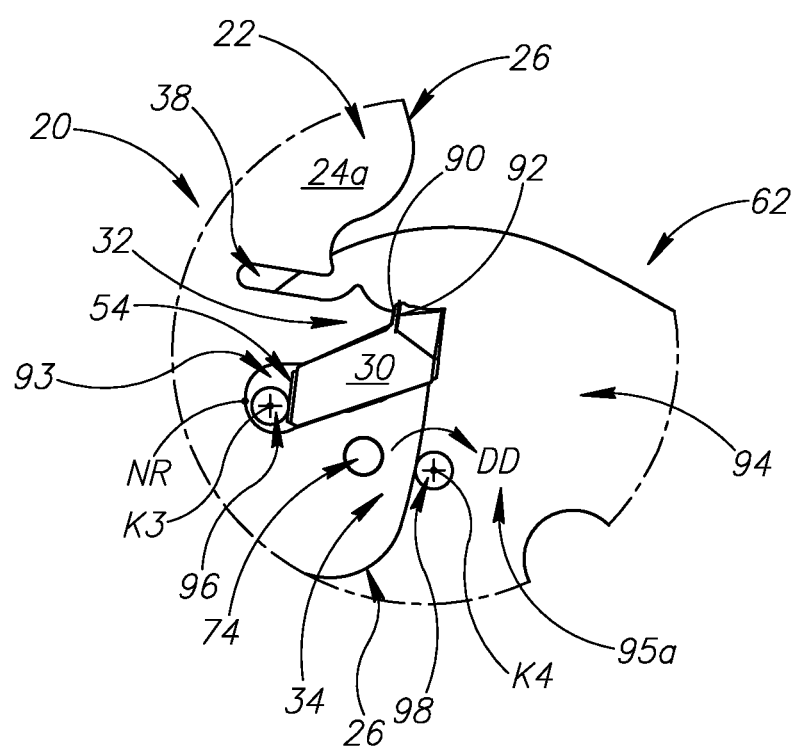
FIG. 13 is a detailed perspective view of the slitting cutter in a fully assembled position and the tool key engaged thereto.

As shown in FIGS. 4 and 13, in the finally assembled position of the slitting cutter 20, each insert's rear surface 54 may be spaced apart from the radially innermost receiving slot point NR of the respective insert receiving slot 36 to form an extraction recess 93.

In some embodiments of the present invention, as shown in FIGS. 8 to 10, the tool key 62 may have a second end portion 94 with opposing third and fourth engagement side surfaces 95a, 95b, and third and fourth key prongs 96, 98 protruding from the third engagement side surface 95a, along third and fourth key axes K3, K4, respectively.

Also in some embodiments of the present invention, the second end portion 94 may be spaced apart from the first end portion 64.

In other embodiments of the present invention (not shown), the third and fourth key prongs 96, 98 may protrude from the second engagement side surface 70b of the first end portion 64.

As shown in FIG. 13, the extraction recess 93 may be configured to receive the third key prong 96, and the fourth key prong 98 may contact the body peripheral surface 26.

In such an arrangement, the third engagement side surface 95a may be in contact with one of the first and second body side surfaces 24a, 24b.

In some embodiments of the present invention, the first and third engagement side surfaces 70a, 95a may be coplanar.

Also in some embodiments of the present invention, the third and fourth key prongs 96, 98 may each be cylindrical-shaped, and have a diameter of 1-2 mm. In some embodiments, the third and fourth key prongs 96, 98 may be cylindrical for their entire length, and thus both may be devoid of a narrowed neck portion 68c and thrust portion 72 of the sort described above with respect to the second key prong 68.

It should be appreciated that for embodiments of the present invention in which the radially innermost receiving slot point NR of each insert receiving slot 36 is located a short radial distance inward of the respective insert's rear surface 54 in the insert's finally assembled position, for example, a distance less than twice the diameter of the third key prong 96, the annular cutting portion 44 may have a relatively small first radial extent ER1, for example, ER1<10 mm.

Also in some embodiments of the present invention, as shown in FIG. 13, rotation of the tool key 62 in a dis-mounting direction DD about the fourth key axis K4 may urge the cutting insert 30 out of the insert receiving slot 36 until a finally dis-assembled position of the slitting cutter 20 is achieved.

Although the present invention has been described to a certain degree of particularity, it should be understood that various alterations and modifications could be made without departing from the spirit or scope of the invention as hereinafter claimed.

What is claimed is:

1. A slitting cutter (20) comprising:
   a disk-shaped cutter body (22) having a cutter axis of rotation (AC) defining a direction of rotation (R) about the cutter axis of rotation (AC), opposing first and second body side surfaces (24a, 24b), and a body peripheral surface (26) extending therebetween,
   a plurality of insert receiving portions (28) circumferentially spaced about the body peripheral surface (26) and a plurality of cutting inserts (30) removably retained therein,
   at least radially outer portions of the first and second body side surfaces (24a, 24b) contained in first and second reference planes (P1, P2), respectively, the first and second reference planes (P1, P2) offset by a body width (WB),
   each insert receiving portion (28) having first and second clamping jaws (32, 34) spaced apart by an insert receiving slot (36), the first clamping jaw (32) resiliently displaceable relative to the second clamping jaw (34) and having a resilient axis of rotation (AR),
   each cutting insert (30) resiliently clamped in its respective insert receiving slot (36), and having a cutting edge (42) intersecting the first and second reference planes (P1, P2),
   wherein:
   the plurality of cutting edges (42) define an outer imaginary circle (CO) having an outer cutting diameter (DO), and the plurality of resilient axes of rotation (AR) define an inner imaginary circle (CI) having an inner cutting diameter (DI),
   and wherein:
   the number N of cutting inserts (30) resiliently clamped in the slitting cutter (20), is the inner cutting diameter (DI), in millimeters, multiplied by a spacing factor (FS), and the spacing factor (FS) is between 0.15 and 0.30.

2. The slitting cutter (20) according to claim 1, wherein: the spacing factor (FS) is between 0.20 and 0.30.

3. The slitting cutter (20) according to claim 1, wherein: the body width (WB) is at least 0.40 mm and at most 1.20 mm.

4. The slitting cutter (20) according to claim 1, wherein: each first clamping jaw (32) is spaced apart from the second clamping jaw (34) of the circumferentially adjacent insert receiving portion (28) by an auxiliary slot (38).

5. The slitting cutter (20) according to claim 4, wherein: each auxiliary slot (38) is located rotationally forward of the insert receiving slot (36) associated with the same insert receiving portion (28).

6. The slitting cutter (20) according to claim 4, wherein in a side view of the slitting cutter (20):
   each insert receiving slot (36) has a radially innermost receiving slot point (NR),
   the auxiliary slot (38) has a radially innermost auxiliary slot point (NA), and the resilient axis of rotation (AR) is located between the radially innermost receiving slot point (NR) and the radially innermost auxiliary slot point (NA).

7. The slitting cutter (20) according to claim 6, wherein:
the radially innermost auxiliary slot point (NA) is located radially inward of the radially innermost receiving slot point (NR).

8. The slitting cutter (20) according to claim 4, wherein:
each insert receiving slot (36) and each auxiliary slot (38) communicate with a chip evacuation recess (40) in the body peripheral surface (26).

9. The slitting cutter (20) according to claim 8, wherein:
each chip evacuation recess (40) is entirely located radially outward of the inner imaginary circle (CI).

10. The slitting cutter (20) according to claim 1, wherein:
the second clamping jaw (34) has greater rigidity than the first clamping jaw (32).

11. The slitting cutter (20) according to claim 1, wherein:
each first clamping jaw (32) is elongated and extends radially outwardly from its resilient axis of rotation (AR).

12. The slitting cutter (20) according to claim 1, wherein:
the inner cutting diameter (DI) ranges from 12 mm to 185 mm;
the body width (WB) ranges from 0.40 mm to 1.20 mm; and
a ratio of the inner cutting diameter (DI) to the body width (WB) is between 10 and 240.

13. A slitting cutter (20) in combination with a tool key (62):
the slitting cutter (20) is in accordance with the slitting cutter of claim 1;
the tool key (62) comprising a first end portion (64) with opposing first and second engagement side surfaces (70a, 70b), and first and second key prongs (66, 68) protruding from the first engagement side surface (70a) along first and second key axes (K1, K2), respectively, the second key prong (68) having a thrust surface (72), the thrust surface (72) having a concave profile in a cross-section taken in a fourth reference plane (P4) containing the second key axis (K2),
wherein in a partially assembled position of the slitting cutter (20) with the tool key (62) engaged thereto:
the first key prong (66) engages a key recess (74) adjacent one of the insert receiving slots (36), and
the thrust surface (72) contacts at least one of two spaced apart first and second corner surfaces (76a, 76b) of the respective cutting insert (30).

14. The slitting cutter (20) in combination with the tool key (62) according to claim 13, wherein:
each cutting insert (30) has opposing upper and lower surfaces (46, 48) and an insert peripheral surface (50) extending therebetween,
the insert peripheral surface (50) having opposing front and rear surfaces (52, 54) spaced apart by opposing first and second insert side surfaces (56a, 56b), the cutting edge (42) formed at the intersection of the upper surface (46) and the front surface (52).

15. The slitting cutter (20) in combination with the tool key (62) according to claim 14, wherein:
the first and second corner surfaces (76a, 76b) are formed at intersection of the front surface (52) and the first and second insert side surfaces (56a, 56b), respectively.

16. The slitting cutter (20) in combination with the tool key (62) according to claim 13, wherein:
rotation of the tool key (62) in a mounting direction (DM) about the first key axis (K1) urges an associated one of the cutting inserts (30) into the insert receiving slot (36) until a finally assembled position of that cutting insert in the slitting cutter (20) is achieved.

17. The slitting cutter (20) in combination with the tool key (62) according to claim 13, wherein:
the thrust surface (72) has two axially adjacent first and second flank surfaces (78a, 78b),
in the cross-section taken in the fourth reference plane (P4), the first and second flank surfaces (78a, 78b) diverge away from the second key axis (K2), and
at least one of the two first and second flank surfaces (78a, 78b) contacts the at least one of the two first and second corner surfaces (76a, 76b).

18. The slitting cutter (20) in combination with the tool key (62) according to claim 17, wherein:
the first flank surface (78a) is located axially further from the first engagement side surface (70a) than the second flank surface (78b), and
the first flank surface (78b) contacts one of the two first and second corner surfaces (76a, 76b).

19. The slitting cutter (20) in combination with the tool key (62) according to claim 17, wherein:
the first and second flank surfaces (78a, 78b) contact the first and second corner surfaces (76a, 76b), respectively.

20. The slitting cutter (20) in combination with the tool key (62) according to claim 17, wherein, in the cross-section taken in the fourth reference plane (P4):
the first and second flank surfaces (78a, 78b) form an external wedge angle (al), and
the wedge angle (al) is at least 70 degrees and at most 130 degrees.

21. The slitting cutter (20) in combination with the tool key (62) according to claim 17, wherein:
the second flank surface (78b) is partially located in a clearance channel (81) in the first engagement side surface (70a).

22. The slitting cutter (20) in combination with the tool key (62) according to claim 17, wherein:
in the cross-section taken in the fourth reference plane (P4), the first and second corner surfaces (76a, 76b) are curved.

23. The slitting cutter (20) in combination with the tool key (62) according to claim 13, wherein:
the first engagement side surface (70a) is in contact with one of the first and second body side surfaces (24a, 24b).

24. The slitting cutter (20) in combination with the tool key (62) according to claim 13, wherein:
the body width (WB) is at least 0.40 mm and at most 1.20 mm.

* * * * *